Dec. 1, 1942.  W. P. SCHMITTER  2,304,031
REVERSING DRIVE MECHANISM
Filed Aug. 10, 1940  2 Sheets-Sheet 2

Walter P. Schmitter
INVENTOR.

BY  Ralph W. Brown
ATTORNEY.

Patented Dec. 1, 1942

2,304,031

UNITED STATES PATENT OFFICE 2,304,031

REVERSING DRIVE MECHANISM

Walter P. Schmitter, Wauwatosa, Wis., assignor to The Falk Corporation, Milwaukee, Wis., a corporation of Wisconsin Application August 10, 1940, Serial No. 352,045

5 Claims. (Cl. 74—377)

This invention relates to reversing drive mechanism.

A reversing drive mechanism of simple compact construction is disclosed in my copending application, Serial No. 301,930, filed October 30, 1939. The reversing mechanism therein shown involves two concentric selectively operable clutches combined with a train of bevel gears in a manner to effect operation of a driven member in opposite directions alternatively.

An object of the present invention is to provide a reversing drive mechanism of the double clutch type which will not require the use of bevel gears.

Another object is to further simplify the construction and operation of reversing drive mechanisms of the type mentioned.

Other more specific objects and advantages will appear, expressed or implied, from the following description of an exemplification of the present invention.

Figure 1:
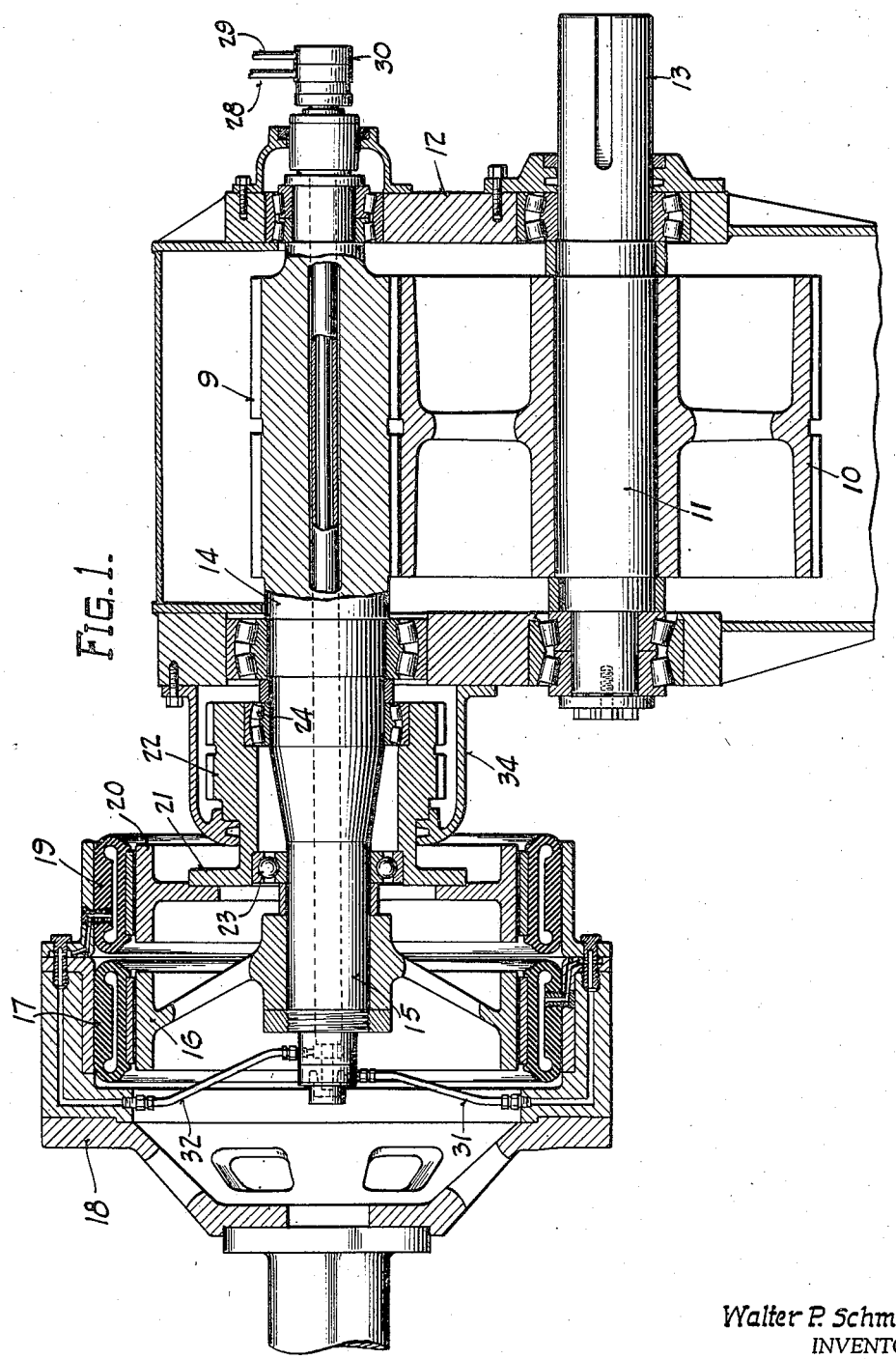
Figure 1 is a sectional view, taken substantially along the line 1—1 of Fig. 2, of a reversing drive mechanism constructed in accordance with the present invention.
Figure 2:
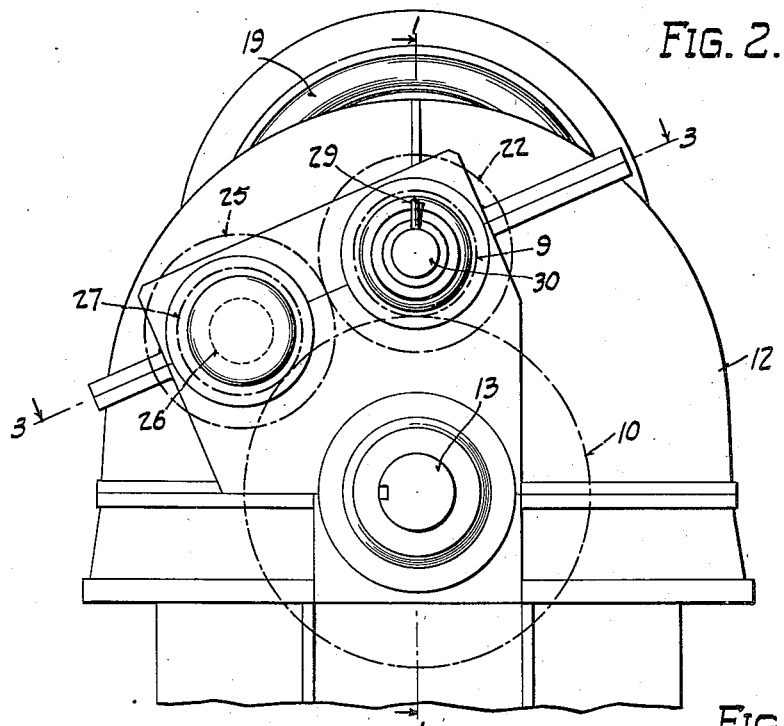
Fig. 2 is an end view.

The reversing drive mechanism selected for illustration and explanation is shown applied to a single reduction, speed reduction gear set comprising a pinion 9 and driven gear 10 meshing therewith. The gear 10 is shown carried by a shaft 11 journalled in opposite walls of an appropriate housing 12 with an end 13 of the shaft projecting in one direction from the housing. The pinion 9 is carried by a shaft 14 also journalled in the opposite walls of the housing but having an end 15 projecting in the opposite direction.

The projecting end 15 of the pinion shaft carries a clutch element in the form of a drum 16 fixed thereto. The drum 16 is disposed concentrically within a coacting clutch element in the form of an annular tubular gland 17 of flexible material, such as rubber or rubber composition and preferably reinforced with cords or fabric.

The gland 17 constitutes a fluid pressure container carried by an encircling driving head 18 and is expansible into gripping engagement with the drum 16. When the gland 17 is thus expanded, it provides a flexible driving connection between the driving head 18 and shaft 13 and pinion 10 by which the latter may be rotated in unison with the driving head.

A second similar gland 19, also carried by the driving head 18, encircles a second clutch drum 20 supported by the shaft end 13 and rotatable with respect thereto. In this instance the drum 20 is fixed to the flanged end 21 of a hollow pinion 22 supported at its opposite ends on appropriate bearings 23 and 24 mounted on the shaft end 13. It will of course be understood that when the gland 19 is expanded into gripping engagement with the drum 20, it provides a flexible driving connection through which the drum 20 and pinion 22 are driven in unison with the head 18.

Figure 3:
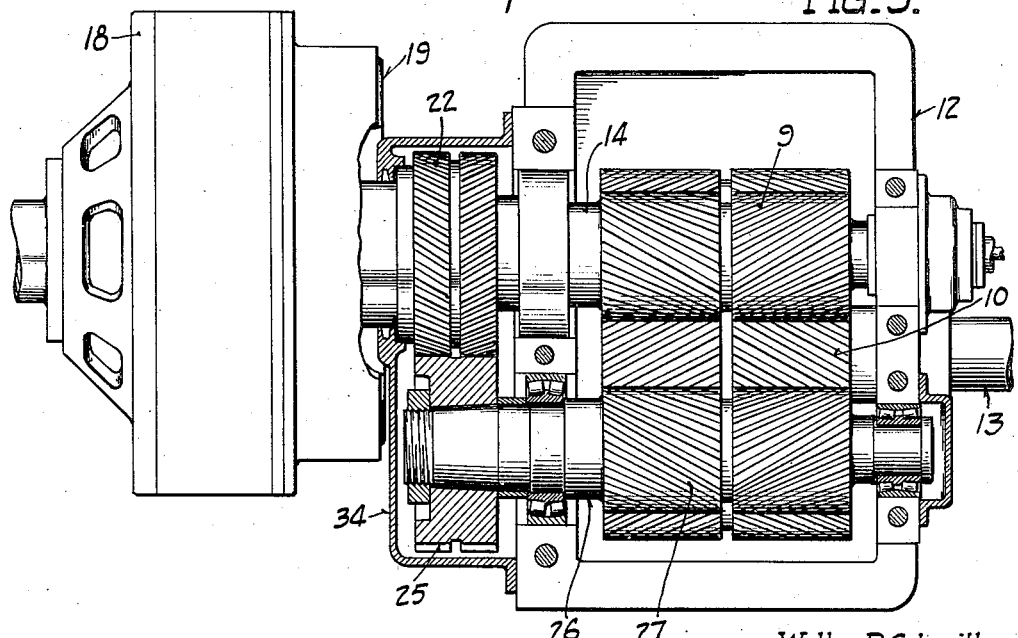
Fig. 3 is a sectional view taken substantially along the line 3—3 of Fig. 2.

As indicated particularly in Fig. 3, the pinion 22 meshes with a pinion 25 fixed on the projecting end of a countershaft 26 that is disposed parallel to the shaft end 13 and journalled in opposite walls of the housing 11. The countershaft carries a pinion 27 that meshes with the gear 10.

The arrangement is such that, when both glands 17 and 19 are deflated, both clutches are open and the driving head 18 rotates idly without affecting the pinion 9 and gear 10. When the gland 17 is inflated and gland 19 deflated, the pinion 9 rotates in unison with the driving head and drives the gear in one direction, and when the gland 17 is deflated and gland 19 inflated, the pinion 22 rotates in unison with the driving head and, through it and the pinions 25 and 27 the gear 10 is driven in the opposite direction.

The supply and release of fluid pressure to and from the glands 17 and 19 may be effected through appropriate means, such for instance as that disclosed in the copending application hereinabove identified. It comprises two fluid conduits 28 and 29 which communicate with the glands 17 and 19, respectively, through separate passages in a joint 30 connected with the forward end of the pinion shaft 14, through separate passages in the pinion shaft, and through separate pipes 31 and 32 leading from the rear end of the pinion shaft 14 to the respective glands 17 and 19.

The pinions 9, 22, 25 and 27, and the gear 10 are preferably of the herringbone or doublehelical type.

The housing 12 is preferably split in a plane 33 passing through the axes of the pinion shaft 14 and countershaft 26 to facilitate assembly. The pinions 22 and 25 are preferably enclosed in a lubricant retainer cover 34 attached to the side of the housing.

Various changes may be made in the embodiment of the invention hereinabove specifically described without departing from or sacrificing the advantages of the invention as defined in the appended claims.

I claim:

1. In a drive mechanism the combination of a stationary housing, a driven gear journalled in said housing, two gears journalled in said housing and meshing with said driven gear, one of said last named gears being carried by a shaft projecting from said housing, two clutch elements supported outside of said housing by the projecting end of said shaft, one of said clutch elements being fixed to said shaft, a gear train connecting the other of said elements with the other of said last named gears, a rotary driver disposed coaxially of said shaft and said clutch elements, two fluid pressure members driven by said driver and expandable into driving engagement with said clutch elements alternatively, and means including connections extending throught said shaft for controlling said fluid pressure members.

2. In a drive mechanism the combination of a driven gear, two pinions meshing therewith to drive the same, a housing enclosing and supporting said gear and pinions, two coaxial clutch elements separately connected in driving relation with said pinions respectively, said clutch elements being supported by said housing externally thereof, a driving unit separate from said housing and including a rotary driver disposed coaxially of said clutch elements, and means providing a flexible driving connection between said rotary driver and said clutch elements alternatively, said last named means including two fluid pressure members between said driver and said elements separately expandable to effect a driving relation between said driver and said clutch elements selectively.

3. In a drive mechanism the combination of a driven gear, two pinions meshing therewith to drive the same, a housing enclosing and supporting said gear and pinions, two coaxial clutch elements separately connected in driving relation with said pinions respectively, said clutch elements being disposed coaxially of one of said pinions at one side of said housing, a driving drum encircling said clutch elements, two fluid pressure members carried by and within said drum and separately expandable into driving engagement with said clutch elements respectively, and means extending from the opposite side of said housing and through said last mentioned pinion for controlling the admission of fluid pressure to said members.

4. In a drive mechanism the combination of a housing, a driven gear journalled at opposite ends therein, two pinions meshing with said gear at peripherally spaced points thereon, each of said pinions being journalled at opposite ends in said housing, two coaxial clutch elements separately connected in driving relation with said pinions respectively, said clutch elements being supported by said housing and arranged externally thereof in coaxial relation with one of said pinions, a driving drum encircling said clutch elements, two fluid pressure members carried by and within said drum and separately expandable into driving engagement with said clutch elements respectively, and means extending through said last mentioned pinion and rotatable with said drum for controlling the admission of fluid pressure to said members.

5. In a drive mechanism the combination of a housing, a gear journalled at opposite ends therein, two pinions meshing with said gear at peripherally spaced points thereon, each of said pinions being journalled at opposite ends in said housing, two clutch elements disposed coaxially of one of said pinions and supported by said housing externally thereof, one of said clutch elements being connected to rotate with said last mentioned pinion, means including a gear train for connecting the other of said clutch elements in driving relation with the other of said pinions, a driving unit separate from said housing and including a rotary driver coaxially disposed with respect to said clutch elements, and means selectively operable to effect a flexible driving connection between said driver and said clutch elements alternatively.

WALTER P. SCHMITTER.